United States Patent [19]
Joy et al.

[11] Patent Number: 6,044,446
[45] Date of Patent: Mar. 28, 2000

[54] MECHANISM TO REDUCE INTERPROCESSOR TRAFFIC IN A SHARED MEMORY MULTI-PROCESSOR COMPUTER SYSTEM

[75] Inventors: Bill Joy, Aspen, Colo.; Gary Lauterbach, Los Altos Hills, Calif.

[73] Assignee: Sun Microsystems, Inc., Palo Alto, Calif.

[21] Appl. No.: 08/886,565

[22] Filed: Jul. 1, 1997

[51] Int. Cl.$^7$ .................................................... G06F 12/00
[52] U.S. Cl. ............................ 711/203; 711/205; 711/207
[58] Field of Search ................................... 711/207, 205, 711/130, 206, 203

[56] References Cited

U.S. PATENT DOCUMENTS

| | | | |
|---|---|---|---|
| 5,255,384 | 10/1993 | Sachs et al. | 711/207 |
| 5,276,828 | 1/1994 | Dion | 395/200 |
| 5,317,752 | 5/1994 | Jewett et al. | 395/182.12 |

Primary Examiner—John W. Cabeca
Assistant Examiner—Mehdi Namazi
Attorney, Agent, or Firm—Townsend and Townsend and Crew LLP

[57] ABSTRACT

A system for reducing query traffic in multi-processor shared memory system utilizes the inclusion of an unshared bit in translation table entries in the address translation system. A query system does not generate queries when the unshared bit indicates that the data has not been shared between the processors.

2 Claims, 3 Drawing Sheets

| LLB | VA | PA | |
|---|---|---|---|
| "1" | VA (P1) | PA (P1) | CPU 2 |
| "1" | VA (P2) | PA (P2) | CPU 1 |
| "0" | VA (P3) | PA (P3) | CPU 1 & 2 SHARED |

MECHANISM TO REDUCE INTERPROCESSOR TRAFFIC IN A SHARED MEMORY MULTI-PROCESSOR COMPUTER SYSTEM

BACKGROUND OF THE INVENTION

1. Field of the Invention.

The present invention relates generally to shared memory inter-processor systems and more particularly relates to reducing the communications between the processors to determine whether cached data is coherent.

2. Description of the Related Art.

Multiprocessor systems typically share a memory to have access to common data. The use of shared memory results in many technical problems that are solved according to the particular architecture of the multiprocessor system.

One multi-processor architecture includes a shared memory and private caches for each processor. The presence of multiple private caches introduces problems of cache coherence, which may result in data inconsistency. A system of caches is coherent if and only if a READ operation performed by any processor in the system of a main memory location at a specified address always delivers the most recent value of the specified address.

The problem arises for multiple caches because several copies of the same data may exist in different caches at the same time. If one of these copies has been modified and the modification has not been communicated to main memory then a READ of main memory will not deliver the most recent value of the data.

In some shared memory multi-processor systems a query is generated for any memory block not found in a local cache in the correct state. Snooping is the process of maintaining coherence between the caches in a shared-memory bus architecture. All cache controllers monitor (snoop) the bus to determine whether they have a copy of the shared cache block.

Query traffic is carried over a query bus which connects the multiple processors in the system. Query traffic is also proportional to the performance of the processors used in the multi-processor system. As larger multi-processor systems with higher performance processors are built, the need for more query bandwidth increases dramatically. Basic physical parameters (capacitance, power) limit the achievable query bandwidths obtainable with current technology.

For example, in the Ultra-SPARC system implemented by Sun Microsystems, the bandwidth of the query bus is currently limited to 9.6 Gbytes.

Accordingly, limiting query traffic is an important requirement for implementing large, high performance multiprocessor systems.

SUMMARY OF THE INVENTION

According to one aspect of the present invention, pages of memory are marked as unshared so that queries do not need to generated when the marked pages are accessed from memory.

According to another aspect of the invention, an unshared bit is included for each translation table entry in an address translation table. The value of the unshared bit indicates whether the page is shared.

According to another aspect of the invention, the generation of queries when a requested page is accessed from memory is dependent on the value of the unshared bit. A query is generated only if the unshared bit indicates that the page is shared.

According to another aspect, the system memory comprises local memories coupled to associated processors by a local path. If the unshared bit of a requested virtual address indicates the page is unshared and the virtual address is found in the memory region of a local memory associated with a requesting processor then the data is transferred on the local path without generating a query on the query bus.

Other features and advantages of the invention will be apparent in view of the following detailed description and appended drawings.

DETAILED DESCRIPTION OF THE PREFERRED EMBODIMENTS

Figure 1:
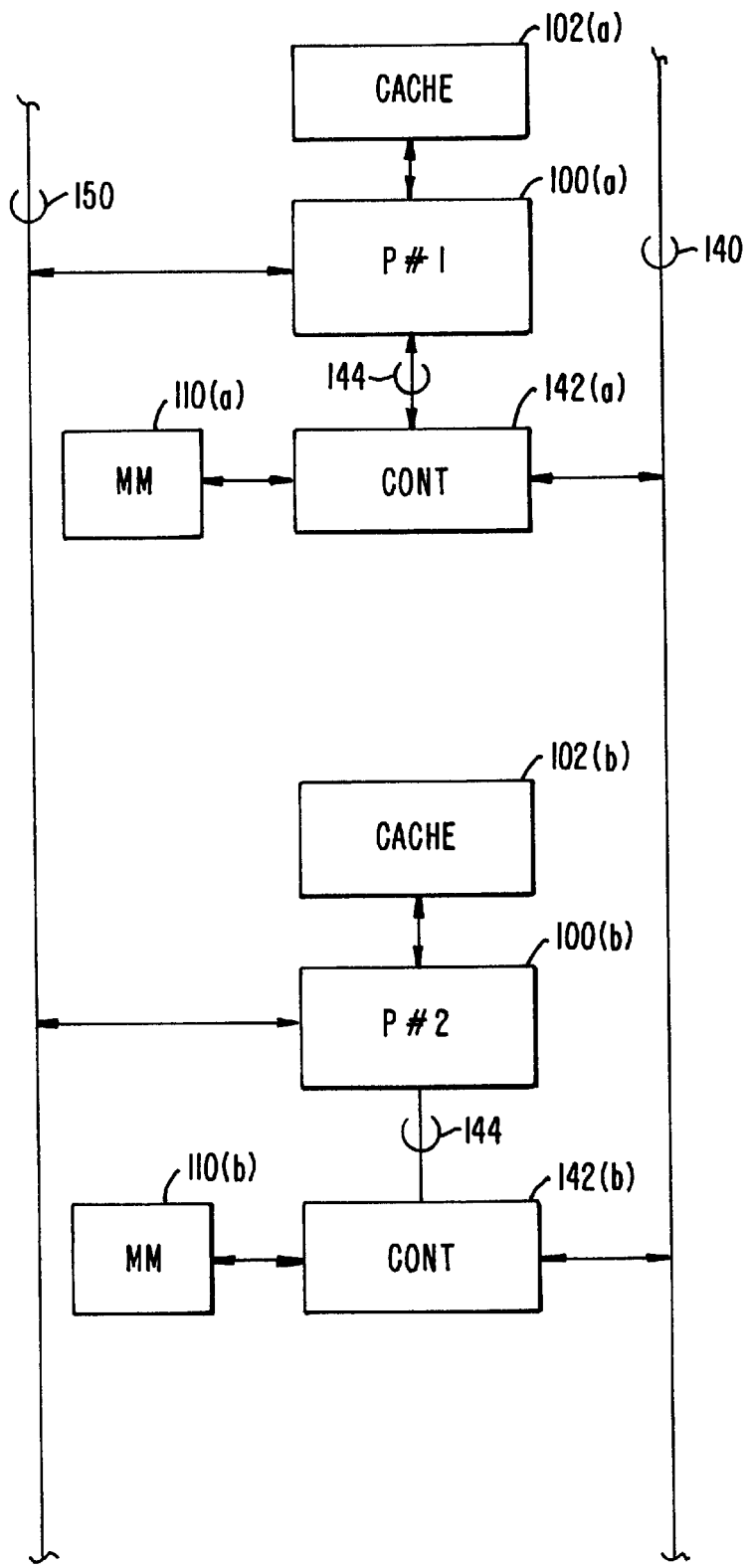
FIG. 1 is a block diagram of a multi-processor system utilizing shared memory.

FIG. 1 is a block diagram of a multi-processor system, including multiple processors 100 and a shared memory 110 in which a preferred embodiment of the invention can be implemented. Referring to FIG. 1, each processor 100 has a cache memory 112 as is described in more detail below with reference to FIG. 2.

The shared memory comprises a local memory associated with each processor 100, with the local memories coupled to other processors by a processor/memory interface bus 140. Additionally, a local memory controller 142 couples each local memory to its local processor and the local memory controller 142 a local memory path 144. The processor 100 is also coupled to a query bus 150 to allow snooping to maintain cache coherency between the local caches of the various processors in the system. Thus, the local memory path 142 provides a path from a local memory component 110 to its local processor that does not require the use of the query bus 150.

Additionally, each processor includes a address translation mechanism (not shown) for translating virtual addresses to physical addresses. Address translation systems are well known and will not be described in detail herein.

Figure 2:
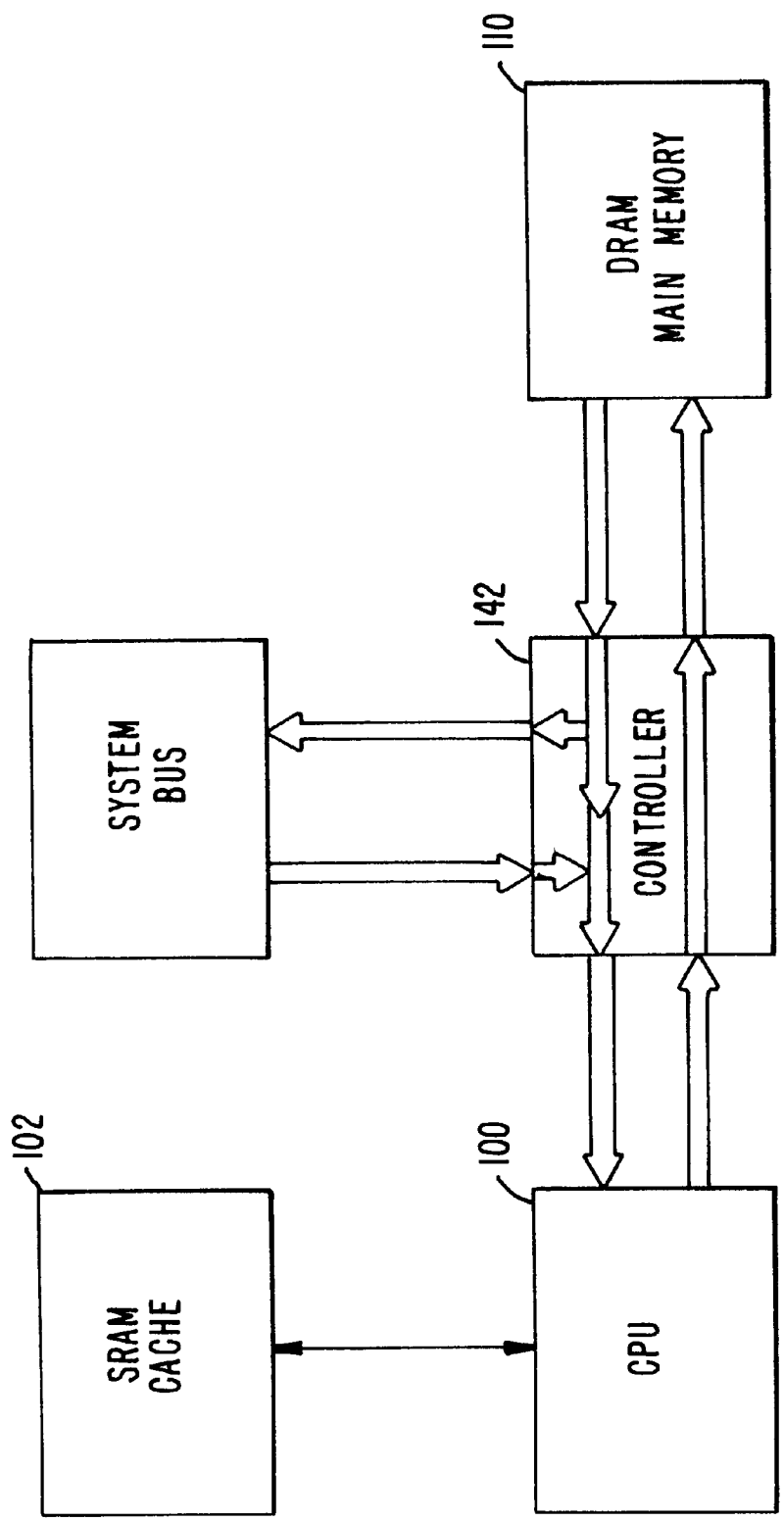
FIG. 2 is a block diagram of a cache system.

FIG. 2 is a block diagram of a cache system. A cache unit 102 is connected to CPU 100 and the local memory controller 142 couples main memory 110, the CPU 100, and the system bus. The cache 102 can be included on the same chip as CPU 100 (on-chip cache) or can exist as separate components. Cache 102 holds data frequently accessed from main memory 110 and delivers it very quickly. Cache 102, in one embodiment, comprises one or more banks of one or more SRAM chips, but may be any non-volatile RAM memory with a fast access time. Main memory 110 in one embodiment comprises one or more banks each having one or more DRAM chips. SRAM components typically offer access times of about 15–25 nanoseconds (ns), whereas DRAM components typically have access times of about 60–100 ns. The process of writing and reading data from cache 102 is controlled by a controller which implements various write strategies, such as write-through, write-back or write-allocate.

The cache system is typically transparent to the CPU. When the CPU reads data, it sends out a request with a memory address to main memory 110. Memory controller 142 intercepts or receives the request and determines whether the requested data is available in cache 102 of the requesting processor. If the data is available in cache 102 (cache hit), the controller reads the data from the quicker cache memory and passes it on to the CPU. On the other hand, if the data is not in the cache (cache miss), the read access is switched through to main memory 110. Memory controller 142 reads the data from main memory 110 and transfers it to CPU 100 and cache 102 simultaneously. The CPU typically operates as if no cache memory were present; the cache memory is transparent to the CPU.

Figures 3, 4:
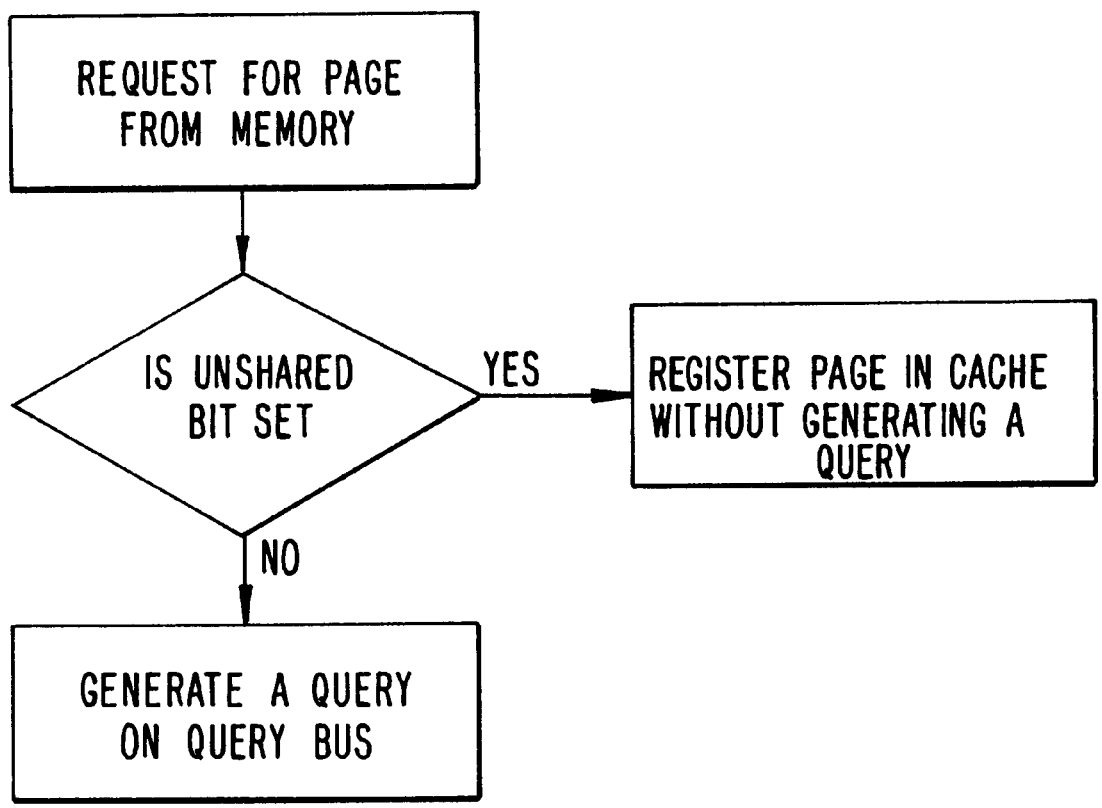
FIG. 3 is a schematic diagram of a translation table having several entries.
FIG. 4 is a flowchart depicting the operation of the invention.

As is well-known, address translation systems typically include a Translation Storage Buffer (TSB) which stores a translation table holding multiple translation table entries (TTEs). FIG. 3 schematically depicts a translation table 300 having several TTEs 320. Referring to FIGS. 1 and 3, a situation is depicted where pages 2 and 3 are stored in the cache 102(*a*) of a first processor 100(*a*) and pages 1 and 3 are stored in the cache 102(*b*) of the second processor 100(*b*).

The TTEs 320 each include the virtual address, physical address, and an unshared bit for each page in memory. The unshared bit is set if the data has not been shared by different processors. Thus, in FIG. 3 the unshared bits for pages 1 and 2 are set because page 2 has been registered only in the cache 102(*a*) of the first processor 100(*a*) and page 1 has been registered only in the cache 102(*b*) of the second processor. The unshared bit of the third page is not set because that page is registered in both caches.

The operation of the system will now be described with reference to FIG. 4 which is flow chart depicting the steps of operation.

Assume the first processor 100(*a*) generates a request for page 1. That page is not stored in the private cache 102(*a*) so the local memory controller 142(*a*) must utilize the TSB to access the page from main memory 110. The TTE 320(*a*) of the first page has an unshared bit which is set. If the missing page is found to be within the local memory address region 10110(*a*) of the requesting processor 110(*a*) then the request is sent to the memory controller 142(*a*) local to this processor without generating a request on the multi-processor query bus 150. Accordingly, the memory controller does not generate any queries on the query bus 150.

On the other hand, if a third processor (not shown) generates a request for page 3, the unshared bit in the TTE 320(*c*) of page 3 is not set so the memory controller generates queries on the query bus to query the status of page 3 in all caches, e.g., the caches 102(*a*) and 102(*b*) to determine whether a write-back operation is required to make the caches coherent.

The system depicted in FIG. 1 is abstract and represents a system that implements a shared memory as a set of memory units local to each processor and coupled by a processor/memory interface. As is understood in the art, the various functions described may be performed by different parts of the system. Alternatively, the shared memory can be implemented as a single unit shared by the processors.

The invention has now been described with reference to the preferred embodiments. Alternatives and substitutions will now be apparent to persons of skill in the art. Accordingly, it is not intended to limit the invention except as provided by the appended claims.

What is claimed is:

1. In a multi-processor shared memory system with each processor having a private cache, an improved system for maintaining coherency between the caches comprising:

a query bus coupling the processors for transmitting query bus transactions when a virtual address referencing a page in memory is generated by a first one of said processors;

an address translation system, coupled to said first one of said processors, including table entries translating a virtual address to a physical address, with each table entry including an unshared bit which is set to indicate that a page addressed by a physical address has not been shared by a plurality of processors; and a querying system, coupled to said processors and said query bus, for generating query transactions on said query bus when reference to a particular page indicated by a particular virtual address is made by the first processor and the particular page is not located in the private cache of the first processor unless the unshared bit in the table entry corresponding to the particular virtual address is set.

2. The system of claim 1, further wherein shared said memory system comprises:

a plurality of local memory units;

a local path from a local memory unit to an associated processor local to the memory;

and wherein:

said querying system utilizes a local path to transfer a particular page referenced by the physical address and does not transmit a query transaction if the particular page referenced by the virtual address is included in a local memory associated with a requesting processor and the unshared bit is set.

* * * * *